United States Patent [19]
Kramer

[11] 3,765,973
[45] Oct. 16, 1973

[54] METHOD OF WELDING TOGETHER TWO THERMOPLASTIC WORKPIECES BY HIGH FREQUENCY VIBRATORY ENERGY

[75] Inventor: George C. Kramer, Danbury, Conn.

[73] Assignee: Branson Instruments, Incorporated, Stanford, Conn.

[22] Filed: Mar. 3, 1972

[21] Appl. No.: 231,524

[52] U.S. Cl. ............................................. 156/73
[51] Int. Cl. ........................................ B32b 31/16
[58] Field of Search ................................... 156/73

[56] References Cited
UNITED STATES PATENTS

| | | | |
|---|---|---|---|
| 3,284,257 | 11/1966 | Soloff et al. | 156/73 |
| 2,087,480 | 7/1937 | Pitman | 156/273 |
| 2,372,929 | 4/1945 | Blessing | 156/273 |
| 3,047,942 | 8/1962 | Schneider et al. | 156/73 |
| 3,480,492 | 11/1969 | Hauser | 156/73 |

Primary Examiner—Douglas J. Drummond
Attorney—Ervin B. Steinberg

[57] ABSTRACT

For welding together by vibratory energy (sonic or ultrasonic frequency) two workpiece portions which are in abutting contact, an energy concentrating element is disposed between the juxtaposed surfaces to be welded. The energy concentrating element promotes the build-up of dissipated energy to quickly provide molten material which flows and upon solidification produces a fused joint.

4 Claims, 7 Drawing Figures

Patented Oct. 16, 1973  3,765,973

METHOD OF WELDING TOGETHER TWO THERMOPLASTIC WORKPIECES BY HIGH FREQUENCY VIBRATORY ENERGY

BRIEF DESCRIPTION OF PRIOR ART

The welding together of thermoplastic parts by vibratory energy in the sonic or ultrasonic frequency range is well established in the art. The use of such energy has been expanded from welding together thin films to rigid and semirigid molded thermoplastic parts. Photographic cameras, automobile taillights, thermoplastic valves, toys, plastic bottles or magnetic tape cartridges are typical examples of thermoplastic parts which are successfully assembled by means of such high frequency vibratory energy, see "New Concepts in Ultrasonic Sealing" (article), R. S. Soloff, Modern Plastics magazine, Volume 41, pages 125 to 129, March 1964.

In welding a workpiece, two workpiece portions are brought into juxtaposition along a common interface surface and vibrations are coupled into one of the plastic portions, such vibrations being then transmitted by the respective portion to the common interface surface. Frictional heat develops at this interface surface, the thermoplastic material melts and flows, and upon cessation of the vibratory energy, the molten and flowed thermoplastic material rigidifies, thus providing a fusion joint between both portions.

In order to obtain a strong weld in a very brief span of time, special joint designs have been developed. The typical joint design includes what has been termed "energy directors" or "energy concentrators" which are protrusions or projections similar to configurations employed in conjunction with electrical resistance welding. The purpose of this special joint design is to concentrate the sonic or ultrasonic energy so as to obtain a rapid melting of material which under the influence of applied static pressure flows to other areas of the joint, filling crevices, recesses, etc., see "Designing Plastic Parts for Ultrasonic Assembly" by Don Kolb, Machine Design (magazine) Mar. 16, 1967, pages 2 to 7, FIGS. 1 and 2.

It has been found that because of manufacturing methods used for certain plastic parts, for instance vacuum forming, or other reasons, it is not always feasible or desirable to incorporate such energy concentrating means in one or both of the plastic parts at the joining surfaces. In such cases, it may be difficult, if not impossible, to sonically or ultrasonically join the parts with sufficient joint strength and/or in a reasonably short time. The applied vibratory energy diffuses over too great an area and fails to soften or melt the plastic parts at the desired location.

Alternatively, when the two parts to be joined meet in a plane and the interface surface is extremely smooth, the parts may slide relative to one another without sufficient heat dissipation being ever achieved to cause softened plastic material.

BRIEF DESCRIPTION OF INVENTION

The arrangement and method described hereafter concern the use of an auxiliary energy concentrating element which is inserted between two portions to be welded together. This auxiliary element is a separate part and is disposed between the surfaces to be welded to each other, and in certain embodiments of the invention remains embedded after welding between these surfaces has occurred. In another embodiment of the invention the energy concentrating element can be withdrawn from the assembled workpiece. The use of a separate energy concentrating element significantly broadens the use of sonic and ultrasonic assembly techniques to parts which heretofore could not be welded to each other and, moreover, provides for a greater versatility of sonic and ultrasonic assembly techniques. Still further, the use of a concentrating element of the type to be disclosed hereafter permits the sonic or ultrasonic assembly of parts which are not initially constructed for this type of assembly.

Further and still other important advantages of the present invention will be more clearly apparent from the following description when taken in conjunction with the accompanying drawing.

DETAILED DESCRIPTION OF THE INVENTION.

Figure 1:
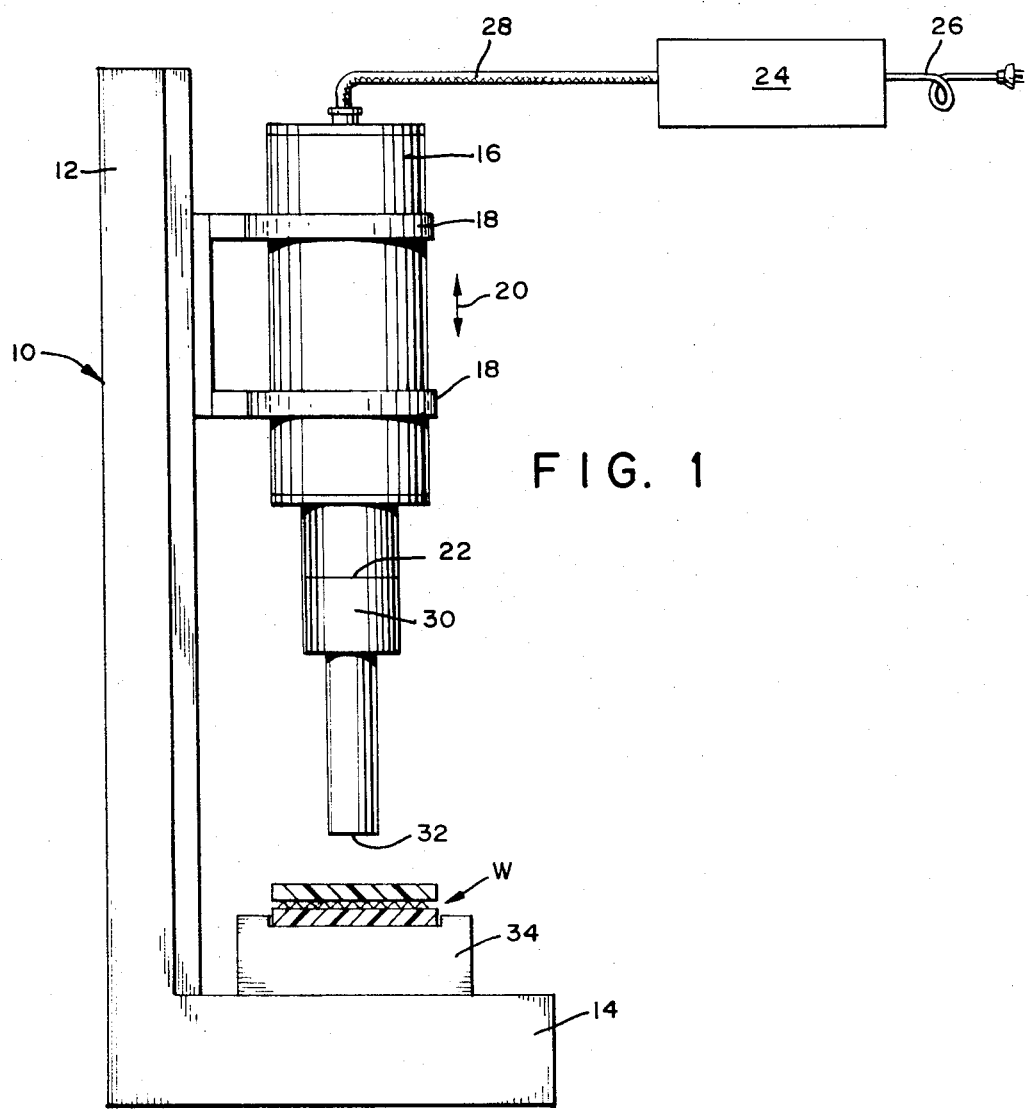
FIG. 1 is a schematic side view of a typical ultrasonic assembly apparatus.

Referring now to the figures and FIG. 1 in particular, there is shown schematically a stand or press 10 which includes a vertical column 12 and a platform 14. An electro-acoustic converter unit 16 is fastened to the stand 10 by means of mounting means 18. The converter unit 16 is adapted to undergo reciprocating motion toward and away from the platform 14 as is indicated by the arrow 20. The reciprocating motion is either accomplished manually or by pneumatic drive means (not shown). Stands of this type are commercially available.

The converter unit 16 provides at an output surface 22 mechanical vibration in response to applied electrical high frequency energy, such energy being obtained from a high frequency generator 24 connectable at its input end by a cable 26 to a suitable power line, and which provides high frequency electrical energy via a cable 28 to the converter unit 16. The high frequency may be in the sonic or ultrasonic frequency range, but moist suitably is in the range between 10 and 60 kHz. The converter unit 16 includes either magnetostrictive or piezoelectric means for converting the applied electrical energy to mechanical vibrations and a typical converter suitable for such purpose is described, in U.S. Pat. No. 3,328,610 entitled "Sonic Wave Generator", S. E. Jacke et al, issued June 27, 1967. A horn 30 also called tool, mechanical amplitude transformer, Sonotrode and the like is mechanically coupled to the output surface 22 of the converter unit and the frontal surface 32 of the horn is adapted to transfer the vibratory energy to a workpiece W which is supported in a nest 34 disposed on the platform 14.

Figure 2:
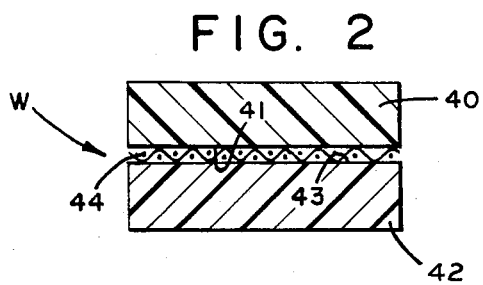
FIG. 2 is an enlarged cross-sectional view of a workpiece to be assembled having an energy concentrating element disposed at the interface.

FIG. 2 discloses the workpiece to be welded in greater detail. The workpiee W comprises a first part 40 and a second part 42. These two parts are to be sealed or fused to each other along their plane and relatively smooth surfaces 41 and 43. These parts most suitably are made of thermoplastic material, such as polypropylene, ABS, high-impact styrene, polyimide or polystyrene. An energy concentrating element 44 is disposed between the juxtaposed surfaces 41 and 43 and this concentrating element, in a typical example, can be thermoplastic screening, metallic screening, wire mesh or the like. It has been found advantageous that the concentrating element have a melting temperature which is not below that of the workpiece portions to be sealed.

Figure 3:
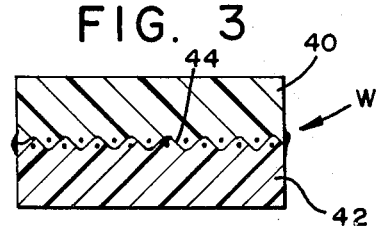
FIG. 3 is a view similar to FIG. 2 with the workpiece welded together.

When the horn 30 is brought into engagement with the workpiece W and the frontal surface 32 transfers energy to the part 40 while a static force urges the pieces 40 and 42 into contact with one another, vibratory energy is dissipated at the locations where the energy concentrating element 44 contacts the surfaces 41 and 43. This condition causes a rapid melting and flowing of thermoplastic material. Upon terminating the flow of vibratory energy and a brief dwell period during which such forced engagement is maintained, a welded workpiece W is obtained as seen in FIG. 3. The surfaces 41 and 43 have been fused to one another. If the energy concentrating element is a metal screen, for instance, or material having a higher melting temperature than that of the surrounding material, the element 44 remains embedded in the joint as a distinct entity, the fused plastic material penetrating through the interstices of the screening. If the element 44 is plastic material it may entirely or partially fuse with the surrounding material. The screen element, moreover, impedes sliding motion of the smooth workpiece surfaces 41, 43 relative to one another which would occur if these surfaces were prior to sealing in direct abutting contact.

Figure 4:
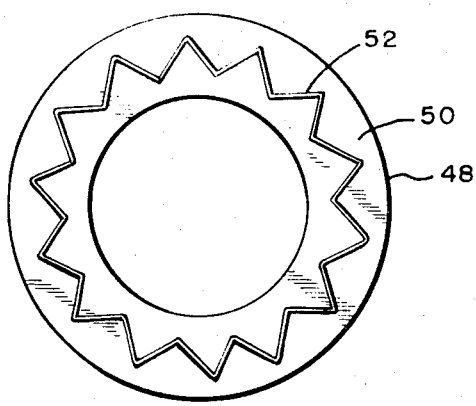
FIG. 4 is a plan view of another workpiece having an energy concentrating element placed on its sealing surface.

FIG. 4 discloses an alternative embodiment, showing an annularly shaped workpiece 48 having a plane sealing surface 50 upon which has been placed a formed concentrating element 52, which may comprise a formed metal wire, plastic wire, etc.

Figure 5:
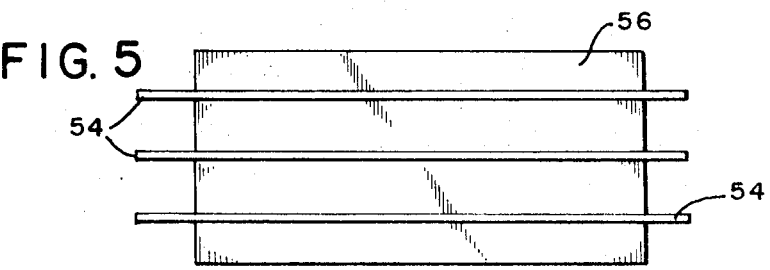
FIG. 5 is a plan view of still another embodiment showing a workpiece having energy concentrating elements placed at the surface to be welded to another part.

FIG. 5 shows a further alternative embodiment in which a plurality of straight non-fusible metal wires 54 have been placed upon the sealing surface of the workpiece 56. It shall be observed that the wires 54 serving as concentrating elements have ends which extend beyond the workpiece. After the workpiece has been welded, the overhanging portions of the concentrating elements 54 can be grasped with a tool and pulled out from the joint area. The resulting sealed channel may either be left as is, may be used for other purposes, or if found to be objectionable, may be plugged or filled with filler material which hardens in situ.

Figure 6:
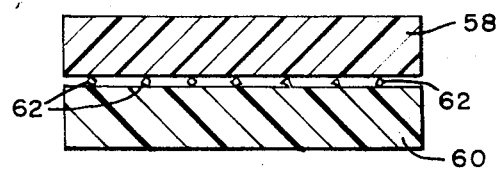
FIG. 6 is a sectional view of two parts to be welded to one another using a different type of energy concentrating means.

A further variation is shown in FIG. 6 wherein particulate matter 62 is disposed between the sealing surfaces of the parts 58 and 60. The particulate matter may comprise granules of glass, ceramic, abrasive particles, metal powder, sand, and the like. Such particulate matter, of course, becomes completely embedded in the joint area and by "biting" into the sealing surfaces responsive to applied pressure prevents sliding motion of the workpiece sections prior to sealing.

Figure 7:
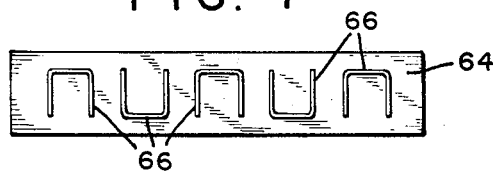
FIG. 7 is a plan view illustrating another embodiment of energy concentrating means.

FIG. 7 indicates still a further embodiment of the present invention in which staple-like elements 66 made of metal or other suitable material are disposed at the sealing surface of the workpiece part 64.

As will be apparent from the above description of the present invention, the energy concentrating element may be made from a great variety of materials and may be shaped to most suitably meet the configuration and requirements of the workpiece. When the workpiece is subjected to electrical stress, it will be quite evident that the concentrating element should be made of non-metallic material so as not to affect the electrical insulation characteristics of the finished product. Tests have shown that the use of such concentrating elements greatly increases the joint strength of those thermoplastic parts which in the absence of such an element are difficult to weld.

It will be appreciated by those skilled in the art that the present technique greatly expands the application of sonic or ultrasonic sealing of plastic materials and simplifies, in many instances, molding techniques by providing a reliable joint without the necessity for redesigning molds in the event that the parts had previously been assembled by methods other than those involving sonic or ultrasonic energy.

What is claimed is:

1. The method of welding together a thermoplastic workpiece along two juxtaposed surfaces by high frequency vibratory energy comprising the steps of:

disposing a metal wire energy concentrating element between the two juxtaposed surfaces of the thermoplastic workpiece to be welded together;

applying a compressive force between said juxtaposed surfaces for urging said surfaces into abutting contact with one another;

contacting one exposed side of said workpiece with a horn vibrating at a frequency in the range from 1 to 100 kHz whereby such vibrations are conducted by said workpiece toward said surfaces in contact with said element, said vibrations causing the build-up of frictional heat and a softening and flowing of thermoplastic material of the workpiece surface portions in contact with said element;

terminating the vibrations and temporarily retaining the compressive force whereby to cause the softened material to rigidify and provide a welded bond between said workpiece surfaces, and withdrawing the metal wire element from the welded bond between said workpiece surfaces.

2. The method of welding together a thermoplastic workpiece as set forth in claim 1, said juxtaposed surfaces being plane surfaces.

3. The method of welding together a thermoplastic workpiece as set forth in claim 1, said concentrating element having an end which protrudes from said juxtaposed surfaces.

4. The method of welding together a thermoplastic workpiece as set forth in claim 1, and filling the space in said bond resulting from the withdrawal of said element.

* * * * *